United States Patent [19]

Harney et al.

[11] 4,059,759

[45] Nov. 22, 1977

[54] PASSIVE AND ACTIVE PULSE STACKING SCHEME FOR PULSE SHAPING

[75] Inventors: Robert C. Harney, Livermore; John F. Schipper, Palo Alto, both of Calif.

[73] Assignee: The United States of America as represented by the United States Energy Research and Development Administration, Washington, D.C.

[21] Appl. No.: 689,766

[22] Filed: May 25, 1976

[51] Int. Cl.$^2$ .................. H01J 39/12; G02B 27/10; G02F 1/01; G02F 1/03

[52] U.S. Cl. .................................... 250/206; 250/578; 350/150; 350/151; 350/160 R; 350/169; 350/172; 356/112; 332/7.51; 331/94.5 M

[58] Field of Search .............. 250/206, 578; 332/7.51; 356/112; 350/150, 151, 160 R, 169, 171, 172, 321; 331/94.5 M

[56] References Cited

U.S. PATENT DOCUMENTS

| | | | |
|---|---|---|---|
| 3,485,552 | 12/1969 | Adler | 350/169 X |
| 3,501,223 | 3/1970 | Rack | 350/150 X |
| 3,551,051 | 12/1970 | Salgo | 356/112 X |

Primary Examiner—Harold A. Dixon
Assistant Examiner—Charles F. Roberts
Attorney, Agent, or Firm—Dean E. Carlson; Roger S. Gaither; L. E. Carnahan

[57] ABSTRACT

Apparatus and method for producing a sequence of radiation pulses with a pulse envelope of time variation which is controllable by an external electromagnetic signal applied to an active medium or by a sectored reflector, through which the radiation passes.

38 Claims, 6 Drawing Figures

PASSIVE AND ACTIVE PULSE STACKING SCHEME FOR PULSE SHAPING

FIELD OF THE INVENTION

The invention described herein was made in the course of, or under, Contract No. W-7405-ENG-48, with the U.S. Energy Research and Development Administration.

This invention pertains to temporal shaping of radiation pulses, and more particularly to shaping of such pulses by modulation with external electromagnetic signals or by sectored partially transmissive reflective means.

RELATED APPLICATIONS

This patent application is a companion to U.S. patent application Ser. No. 689,751 to Robert J. Harney filed May 25, 1976, entitled "Method and Apparatus for Pulse Stacking" and assigned to the same assignee.

BACKGROUND OF THE INVENTION

Certain physical processes involving laser irradiation require radiation intensities which grow in peculiar fashion, often faster than exponential, and over time periods substantially longer than the rise time of a single pulse (~25 picoseconds). One method of achieving this growth, known as pulse stacking, splits a single laser pulse into a sequence of time-delayed pulse images, changes the intensity of each pulse image, recombines the images to form a pulse envelope of desired shape. As few as seven pulse images often suffice for adequate pulse envelope definition.

One simple and successful method is the passive pulse stacking scheme disclosed in U.S. Pat. No. 3,879,109 to C. F. Thomas (issued Apr. 22, 1975) which uses two sets of partially transmissive parallel mirrors, spaced apart and with differing reflectivities, to obtain an exponentially increasing pulse envelope. The Thomas system is passive in that no physically active mechanism is required to produce the pulse sequence. This is at once both an advantage, in that it requires little or no maintenance and offers reproducible results, and a disadvantage, in that any change in system parameters usually requires replacement of one or more mirrors and realignment of all. Further, the temporal rate of growth of the pulse envelope is theoretically limited, as will appear below.

U.S. Pat. No. 3,675,022 to M. A. Nelson et al. (issued July 4, 1972) discloses the use of a Kerr cell system, with phase shift proportional to the square of the applied voltage, for modulating a laser beam, utilizing a birefringent liquid in the Kerr cell. Nelson et al. were concerned primarily with phase matching the optical (laser) signal and the electrical (applied voltage) signal as the signals simultaneously propagate through the Kerr cell.

U.S. Pat. No. 3,408,593 to H. Hurwitz (issued Apr. 30, 1964) discloses the use of a Kerr cell or a Pockels cell plus two crossed polarizers within the laser cavity (located between two or more reflective means) to act as a shutter of controlled duration for a pulse of polarized light issuing from the laser. The possibility of pulse shaping or of generating a series of modulated pulses is not considered by Hurwitz.

U.S. Pat. Nos. 3,297,876 and 3,518,436 to A. J. De Maria et al. (issued Jan. 10, 1964, and June 30, 1970, respectively) teach the use of Kerr cell plus two crossed polarizers, located either inside or outside the cavity of a mode-locked, Q-switched laser, to generate a sequence of short ($10^{-3} - 10^{-9}$ second) duration, equispaced pulses. Again, the possibility of shaping the envelope of pulses by particular choices of Kerr cell voltage is not considered by De Maria et al.

Selection of a single picosecond laser pulse is obtained by the invention disclosed in U.S. Pat. No. 3,519,328 to D. D. Grossman (issued July 7, 1970) which uses a Kerr cell, two crossed polarizers and a chamber filled with an easily ionizable gas such as argon, the argon being triggered by the arrival of a portion of the original laser pulse. Here, the concern is with selecting a single pulse by short duration activation of the Kerr cell.

U.S. Pat. No. 3,532,890 to R. T. Denton (issued Oct. 6, 1970) discloses an optical multiplexing and demultiplexing system wherein a train of pulses is divided into a plurality of distinct pulse trains, appropriately delayed in time, and each pulse train is separately polarized, modulated, and analyzed using an electro-optical or magneto-optical material; the separate pulse trains are then interleaved again at the demultiplexing stage. Denton does not consider the possibility of temporally varying the electromagnetic modulation field; and, indeed, this might be detrimental for his purposes.

The above mentioned patents disclose the use of electro-optical modulators for control of the duration of the light pulse. As noted, none of the patent discloses contemplates use of such a modulator for temporal pulse shaping. No patents have been discovered which disclose use of a magneto-optical modulator for purposes of control of light pulse duration for temporal pulse stacking or shaping. Further, the Thomas patent, supra, appears to be the only one yet issued which discloses use of a passive system (requiring two pairs of parallel partially reflective surfaces) for temporal pulse stacking. However, the use of a Faraday rotator (a magneto-optical device) as a radiation isolator, to protect the system against damage due to back-reflected radiation, is well known.

SUMMARY OF THE INVENTION

One object of the subject invention disclosed and claimed herein is to provide a means for generating a composite pulse or sequence of pulses with a pulse envelope of controllable temporal variation, from a beam of pulsed electromagnetic radiation, said means comprising beam splitting means to generate two or more beam components; two or more partially transmissive mirrors, spaced apart and arranged to receive one component of the beam issuing from the splitter; polarizer means and a second crossed polarizer means; modulation means, located between the two polarizing means, for producing a phase shift of the polarized radiation in response to an externally applied electro-magnetic signal; and means for receiving the second component of the beam from the splitter and, in response thereto, for externally applying a controllable, time-varying electromagnetic signal to the phase shift means.

Another object of the subject invention is to provide a means for generating a composite pulse or sequence of pulses with a pulse envelope of controllable temporal variation, from a beam of pulsed electromagnetic radiation, said means comprising a sectored reflector, comprising a finite number of partially transmissive reflective means which may have different transmission coefficients, and a fully reflective means, spaced apart from and substantially parallel to the sectored reflector.

Other objects and advantages of the subject invention will become apparent by reference to the drawings, the detailed description and the claims.

Figure 1:
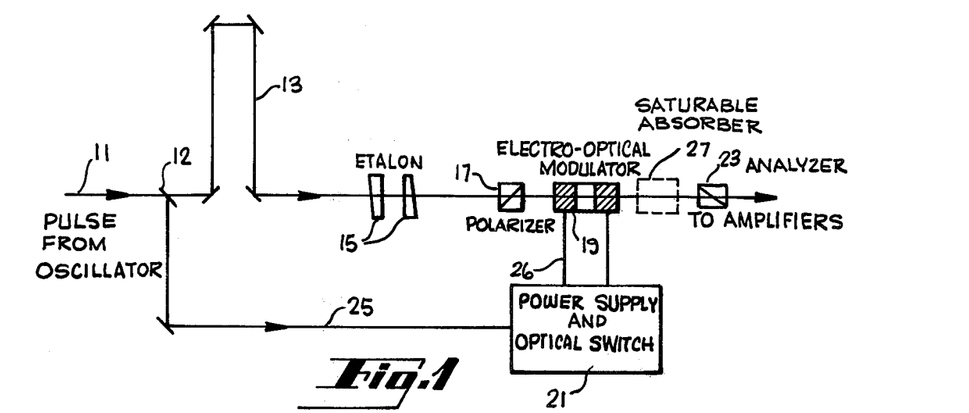
FIG. 1 is the preferred embodiment, wherein the phase shift means includes a Pockels cell or a Kerr cell and means for generating an electrical voltage.

With reference to FIG. 1, a laser beam single pulse 11 (nominally 25-100 picoseconds long) is incident from the left on a system which comprises a beam splitter 12, an optical delay line (optional) 13, an etalon 15, a beam polarizer 17, an electro-optical modulator (such as a Pockels cell or a Kerr cell) 19, an associated power supply and optical switch 21 and a beam analyzer 23 with crossed polarization (polarization direction orthogonal to the first polarizer direction). The original beam 11 is split at 12 by, say, highly transmissive beam splitting means, and a small part of the original beam intensity is directed along a path 25 to activate the power supply and optical switch 21 for the electro-optical modulator.

Where the modulator 19 operates electro-optically, the power supply and optical switch 21 produces a voltage signal which moves along the path 26 to the modulator 19. The power supply and optical switch 21 may then be constructed as disclosed in the above identified companion application, U.S. Ser. No. 689,751. If the modulator operates magneto-optically, as with the Faraday rotator shown in FIG. 3, the power supply and optical switch 21 produce a current signal which moves along the path 26 to a coil 20 which envelops the magneto-optically active material 18.

Referring again to FIG. 1, the remainder of the beam ($\leq$ 100%) is transmitted at the splitter 12 and passes on to the etalon 15, a parallel pair of partially reflective mirrors with frontal reflectivities R ($<$ 1) and reflectivities r for the etalon backing. The two mirrors comprising the etalon are spaced apart a distance d, and the round trip or transit time for a pulse image reflected by each of the mirrors in succession is $\tau = 2d/c$ ($c$ = speed of light in the medium of interest, usually air). At each round trip between the mirrors, a fraction (1-R) of the remaining pulse image intensity is transmitted through the rear mirror and proceeds on to the polarizer 17, while a fraction R of this same remaining pulse image intensity is reflected and returns to the front mirror, there to be reflected again. This produces a sequence of pulse images, separated by time intervals $\tau$. If the original beam pulse has intensity $I_o$ and a shape function $\psi(t)$, the temporal variation $\psi_m(t)$ of the mth pulse image relative to the original pulse, in the absence of dispersion, is believed to be $$\psi_m(t) = I_m \psi(t - D_m),$$

$I_m = I_o(1-R)^2 (1-R)^2 R^{2(m-1)}$ = intensity of mth pulse image ($m = 1,2,3 \ldots$), $D_m = (m-1)\tau$ = delay time of mth pulse image.

For purposes of analysis, one often assumes a Gaussian pulse with $$\psi(t) = [2\pi\sigma^2]^{-1/2} \exp(-t^2/2\sigma^2)$$

with $\sigma$ of the order of 1-100 picoseconds.

Each pulse image transmitted through the rear mirror of the etalon 15 next encounters a polarizer 17 and, further downstream, an analyzer 23 (polarizer with its direction of polarization "crossed" or orthogonal to the first polarization direction). With no element inserted between polarizer 17 and analyzer 23, the signal appearing at 27 is effectively zero. With a linear electro-optical modulator 19 such as a Pockels cell interposed between the crossed polarizers, the signal at 27 is still zero with zero voltage imposed across the cell electrodes. But with a non-zero voltage V(t) imposed, the modulator 19 changes the relative phase shift between orthogonal components of the polarized radiation. This effectively rotates the polarization direction toward the (initially orthogonal) direction of the analyzer by an amount $$\phi(t) = \phi_1 V(t),$$

where $\phi_1$ is a constant depending only upon the active material in the modulator and the frequency of the radiation; the signal appearing at 27 may then be non-zero as a result of the phase shift $\phi(t)$. With a linear modulator inserted as the active element, the signal at 27 becomes $$\psi_m^{(27)}(t) = A \psi_m(t) \sin^2[\tfrac{1}{2} \phi(t)]$$

for each pulse image $m = 1,2,3 \ldots$, where $A (\leq 1)$ is the attenuation factor of the beam after passing through polarizer, modulator or other active element, and analyzer.

By judicious choice of the applied voltage V(t), then, one controls the shape of the pulse envelope appearing at 27 as the pulse images $\psi_m(t)$ arrive at different times. One attractive choice, the first one investigated here, is $$V(t) = V_o + V_1 \sin(\omega t + \beta)$$

$0 \leq t \leq T = N\tau$ (N a positive integer), $T \leq \pi/\omega$.

This insures that the applied voltage V(t) changes through at most half a sinusoidal cycle. With appropriate choice of the constants $V_o$, $V_1$ and $\beta$, then, the effective phase shift $\tfrac{1}{2} \Phi(t)$ may vary from 0 to $\pi$ radians. With the choice of potassium dihydrogen phosphate, $KH_2PO_4$ (KDP), as the modulator material, the constant $\phi_1$ is approximately $3.6 \times 10^{-4}$ volt $^{-1}$ at a laser wavelength of $\lambda = 5000$ A. A maxmum applied voltage $V_{max} = 8730$ volts across a 1-cm cell of KDP is then required for an effective phase shift of $\frac{1}{2} \phi = \pi/2$ radians, where the analyzer 23 becomes "transparent" to a polarized and rotated pulse image arriving thereat. Other attractive (linear) electro-optical modulator materials include $KD_xH_{2-x}PO_4$, $NH_4H_2PO_4$, $ND_xH_{6-x}PO_4$, ZnS, ZnTe, CuCl and quartz, as well as some exotic modulator compounds, GaAs, $LiNbO_3$, $LiTaO_3$ and $BaTiO_3$, noted by A. Yariv in his book *Quantum Electronics*, Wiley & Sons, First Edition, 1967, pp.300–311. At a representative wavelength of $\lambda = 5000$ A, the theoretical phase shift constants for the above materials require maximum applied voltages of the order of 2600–360,000 volts for an effective phase shift of $\frac{1}{2} \phi = \pi/2$ radians.

Figure 3:
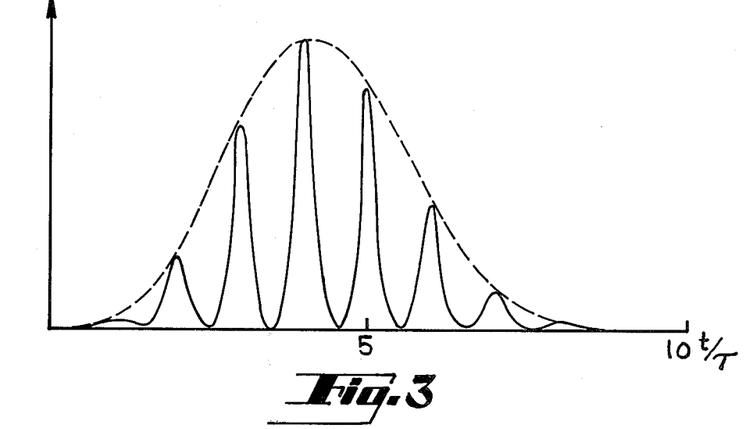
FIG. 3 is a graphical representation of the sequence of pulses generated by the etalons and modulated by the Pockels cell of FIG. 1, with an externally applied voltage $$V(t) = V_1 \sin \omega t (\omega = \frac{\pi}{T}).$$

FIG. 3 exhibits a typical pulse envelope and sequence of pulse images for the linear modulator with the choices $V_o = 0$, $\phi_1 V_1 = \pi$, $\beta = \pi/2$, $\omega T = \pi$, $N = 10$ and $R = 0.90$. Here, the pulse envelope is defined by a sequence of 10 pulse images; the envelope is not symmetric about $\omega t = \pi/2$, due to the presence of the reflectivity factors $R^{2m-2}$ ($m = 1, 2, \ldots 10$) which decrease as $m$ increases.

The presence of the multiplicative factor $(1-R)^2$ in $\psi_m(t)$ indicates that one may not choose the reflectivity parameter $R = 1$ in the etalon. An optimum choice for R for the linear modulator and etalon combination shown in FIG. 1 is approximately $R = 0.83$, for either of two interesting parameter choices $(\phi_1 V_o, \phi_1 V_1, \omega T) = (0, \pi, \pi)$ or $(\phi_1 V_o, \phi_1 V_1, \omega T) = (0, 2\pi, \pi/2)$ and with $N = 20$. The above choice of R maximizes the system efficiency, $\eta$, defined as the ratio of integrated output intensity to integrated input intensity. For the linear modulator, the theoretical value of $\eta_{max}$ is about 2.6%, ignoring the modulator attenuation factor A, but the experimental values lie below this. By way of comparison, the theoretical maximum efficiency for the Thomas device, supra, with $N = 20$ pulses considered, appears to be $\eta_{max} = 2.7\%$ and requires reflectivities $R_1 = R_2 = 0.90$; any choice of reflectivities $R_1 = R_2$ in the Thomas system results in a sequence of pulse images of constant magnitude so that no temporally-rising shaping of the pulse image envelope occurs.

Another measure of system performance is the maximum time rate of growth of the pulse image envelope, $\dot{e}$. The theoretical maximum growth rate for the linear modulator of FIG. 1 is attained at reflectivity $R = 0.50$, where the rate is $\dot{e}_{max} = 0.0037$ $(I_o/\tau)$ for $N = 20$ pulses. By way of comparison, the pulse image envelope growth rate $\dot{e}$ for the Thomas device reaches a theoretical maximum $\dot{e} = 0.0188$ $(I_o/\tau)$ with the choices $R_1 = 0.95$, $R_2 = 0$ for $N = 20$ pulses. With such a choice of (small) $R_2$, the efficiency $\eta$ falls to 1.8%. For a non-optimal choice of $R$, say $R = 0.80$, the pulse envelope growth rate for the linear modulator is $\dot{e} = 0.0021$ $(I_o/\tau)$. By way of comparison, the Thomas device with $R_1 = 0.95$ and $R_2 = 0.80$ is $\dot{e} = 0.006$ $(I_o/\tau)$, about 28% of the corresponding linear modulator response. Generally, it appears that the efficiency for the Thomas device is comparable to the efficiency of the linear modulator; but the pulse envelope growth rate for the Thomas device lies below the rate of the corresponding linear modulator for reasonable choices of reflectivity parameters.

The foregoing discussion has considered only voltage forms $V(t) = V_o + V_1 \sin(\omega t + \beta)$ with $V_o = V_1$ and $\omega T = \pi/2$. With, say a modulator which is initially partially open ($V_o = V_1 \sin \beta$ $\pi/2 \phi_1$), the efficiency $\eta$ of the linear modulator increases, but the pulse envelope growth rate is reduced correspondingly. If one is concerned only with the rising portion of the phase envelope $\sin^2 [\frac{1}{2} \phi(t)]$, then imposition of such a positive bias may be an attractive alternative. Another approach which can be used to increase efficiency and change the envelope shape is the use of a delay line for the pulse images, as shown in FIG. 1; the active modulation element is then partly "open" when the first pulse image arrives.

Rather than the two-term voltage considered above, one may impress a finite sum such as $$V(t) = V_o + \sum_{n=1}^{M} V_n \sin(\omega_n t + \beta_n)$$

$\beta_n$ fixed at the electro-optical modulator, with $V_o, V_1, \ldots V_M, \omega_1 \ldots \omega_M$ and $M$ (a positive integer) arbitrary. This choice allows a desired pulse envelope shape to be matched reasonably closely over some time interval, say [O,T]. For definiteness here, assume $\omega_n = n\omega(n=1,2 \ldots M)$, and assume that the pulse image envelope $$e(t) = \sum_{m=1}^{N} A \psi_m(t) \sin^2 [\frac{1}{2} 0(t)]$$

is to match some prescribed function $\epsilon(t)$ as closely as possible. Each pulse image function $\psi_m(t)$ is non-zero only over an interval of width $\leq \tau$ so that one may write approximately $$\sum_{m=1}^{N} \psi_m(t) \doteq$$
$$I_o (1-r)^2 (1-R)^2 e^{\alpha(1-t/\tau)} \sum_{m=1}^{N} \psi(t - D_m),$$
$$a = -\ln(R^2).$$

One now employs the method of Clairaut and Lagrange, as described by E. Whittaker and G. Robinson in *The Calculus of Observations*, Dover Publ., New York, 1967, pp. 263–67, to match the prescribed function $\epsilon(t)$ at a discrete set of points, such as $(t/\tau) = 0, 1, 2 \ldots N$, in the interval [O, N$\tau$]. That is, one determines the coefficients $V_1 \ldots V_M$ (with $M = N$, $\omega = \frac{\pi}{(N+1)\tau}$, $V_o = 0$), so that $$\sum_{n=1}^{N} V_n \sin(n\omega t + \beta_n) \bigg|_{t=m\tau} \quad (m = 0, 1, 2, \ldots, N-1),$$

$$= \frac{2}{\phi_1} \sin^{-1} \left( \left[ e^{\alpha \frac{t}{\tau}} - 1 \right) \frac{\epsilon(t)}{A} I_o (1-r)^2 (1-R)^2 \psi_{max} \right]^{\frac{1}{2}} \right) \bigg|_{t=m\tau},$$

$\beta_n$ fixed, $$\psi_{max} = \psi(t=0)$$

If the angular frequencies of the impressed sinusoidal voltages sin $(n\omega t)$ are too high, inductive effects may distort and limit the sinusoidal time variation. Where only a single sinusoidal voltage is present, the amplitude is reduced by inductive effects, but no substantial signal distortion occurs. However, where two or more different sinusoidal voltages are impressed, the amplitude of each will be reduced by a different amount by inductive effects, and the sum signal will be distorted. Where the inductive contributions are known, of course, the coefficients $V_n$ may be adjusted to correct for this effect.

Functions other than sinusoidal or cosinusoidal functions or simple sums thereof may also be used as input voltage $V(t)$, although these other functions may not be so easily generated. Simple polynomials in $t$ may be used as well as finite sums of functions drawn from any mathematically complete, orthonormal set of functions.

An alternative approach, not shown here, uses elliptically-polarized radiation (which includes circularly-polarized radiation by definition) rather than linearly-polarized radiation. The polarizer 17 in FIG. 1 (or FIG. 3) is replaced by a device, such as a waveplate, which produces a definite sense of elliptical polarization in the incident radiation. If the active modulation element 19 is initially biased by the proper voltage or magnetic field corresponding to an appropriate phase shift $(\frac{1}{2})\phi_o$, the elliptically-polarized radiation will be converted by the active element 19 to radiation polarized linearly in a direction orthogonal to the transparent direction of the polarizer. If an additional voltage corresponding to a phase shift of $\pi/2$ is impressed upon the active element, the total phase shift will change from $(\frac{1}{2})\phi_o$ to $((\frac{1}{2})\phi_o + \pi)$ and the radiation will become polarized in a direction along the transparent direction of the analyzer. This is exactly equivalent to the linearly-polarized case with zero initial voltage and half-wave voltage. In fact, any elliptically-polarized pulse is exactly equivalent to a linearly-polarized pulse if the reference voltage is chosen to correspond to an appropriate phase shift $(\frac{1}{2})\phi_o$ instead of zero. Thus, any change in the initial bias voltage from that corresponding to $(\frac{1}{2})\phi_o$ in the elliptically-polarized case is equivalent to adding a non-zero bias voltage in the linearly-polarized case.

The active element 19 of FIG. 1 has been assumed heretofore to be a linear electro-optical modulator, such as a linear Pockels cell. This cell may be replaced by a quadratic Pockels cell or by a Kerr cell, where the phase shift is proportional to the square of the applied voltage, viz., $$\phi(t) = \phi_2 [V(t)]^2.$$

The linear modulator requires an active material (usually solid state) which has no center of spatial inversion symmetry. The quadratic Pockels cell and the Kerr cell utilize active materials which may have spatial inversion symmetry, such as the solid state materials $K Ta_{0.65} Nb_{0.35} O_3$, $K Ta O_3$, $Sr TiO_3$, and $Ba Ti O_3$ cited by Yariv, supra, as suitable for a quadratic Pockels cell. Liquid nitrobenzene is the best known active material suitable for Kerr cells.

Where a quadratic active material is used in the active element 19, the optimal choice of reflectivity parameter R changes vis-a-vis the choice for the linear system. The choice $R = 0.88$ maximizes system efficiency $\eta$, with $\eta_{max} = 1.5\%$ if one ignores beam attenuation in the polarizer, analyzer and active element. Maximization of pulse image envelope growth rate $\dot{e}$ with either quadratic system requires a choice $R = 0.84$, where the growth rate becomes $\dot{e} = 0.00078 (I_o/\tau)$. These values are referenced to a choice $V(t) = V_o = V_1 \sin \omega t$ as above, with $\omega T = N\omega\tau = \pi/2$ or $\pi$ and $N = 20$ pulses utilized in the modulation. Note that both the efficiency and the maximum pulse image envelope growth rate for the quadratic system are somewhat lower than that for the linear system. One putative advantage of a quadratic system is that the half wave voltage $((\frac{1}{2})\phi = \pi/2)$ for the quadratic modulator is typically $\Delta V \sim 75$ volts, as compared with the required half wave voltages of 2600–360,000 volts for the linear Pockels cell. This allows shorter voltage risetimes to be used, but puts a higher demand on accuracy of the voltage magnitude as a function of time. The baseline voltage required here, from which the change $\Delta i$ V $\sim 75$ volts is referenced, may be of the order of 2000 volts.

Figure 2:
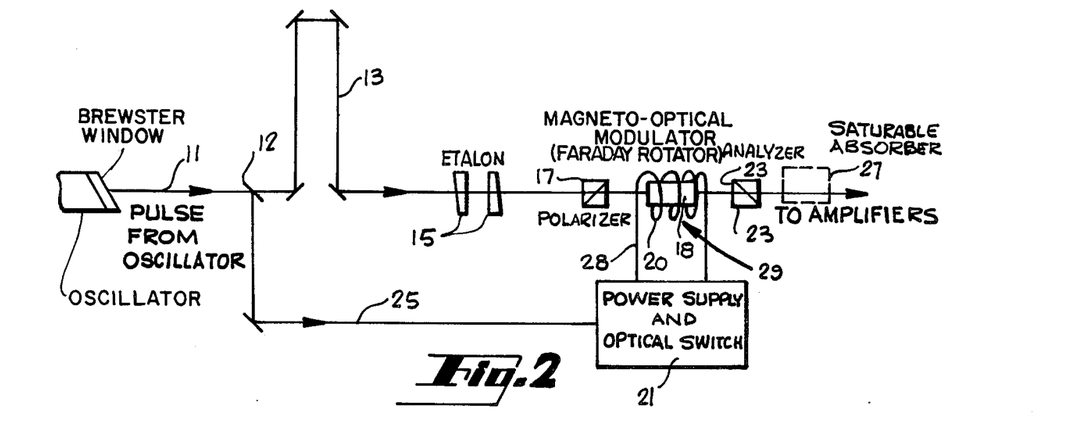
FIG. 2 is an alternative embodiment, wherein the phase shift means includes a Faraday rotator and means for generating a magnetic field.

Another embodiment, shown in FIG. 2, replaces the Pockels cell or Kerr cell by a Faraday rotator 29 or other magneto-optical device, with other identified elements of the system remaining substantially unchanged. Here, the power supply and optical switch means 21 produces an electrical current $J(t)$ which moves along line 28 to the Faraday rotator 29 and through a coil or other device surrounding the rotator to produce a time-varying magnetic field $B(t)$ ($\propto J(t)$) at the active crystal or liquid (of length L) which exhibits the Faraday effect. The crystal or liquid, thus perturbed, then rotates the direction of transverse linear polarization of the radiation propagating axially within the crystal, the amount of rotation being given by $$\Delta\theta = V_e L B(t).$$

$V_e$, the Verdet constant of the active material, is independent of field strength except at extremely large values of B. The magneto-optical rotation of a line of polarization is a true rotation: No matter what may be the orientation of the line of radiation polarization, said line will be rotated by an amount $\Delta\theta$ substantially as given above after the radiation passes through the magneto-optically active material with impressed field $B(t)$. The line "rotation" associated with an electro-optical modulator is not a true rotation, but merely a phase shift of two orthogonal components of the radiation relative to one another. In practice, one would orient the line or polarization (introduced by the first polarizer 17) at some non-zero angle such as $\theta = \theta_o = \pi/4$ relative to one of the birefringence axes of the electro-optical modulator; with an appropriate voltage $V(t)$ applied to the modulator electrodes, the phase shift $\phi(t) = \phi_1 V(t)$ (or $\phi(t) = \phi_2[V(t)]^2$) introduces elliptically polarized radiation with a major axis which is rotated by an amount substantially $\Delta\theta = (\frac{1}{2})\phi(t)$. Of course, only the polarization component parallel to the line $\theta = 3\pi/4$ will pass through the analyzer so that one never "sees" the entire ellipse at the analyzer output. The "rotation" of the line of polarization will then depend upon the initial angle $\theta_o$ of the polarization direction.

Another difference manifested by magneto-optical modulators, vis-a-vis electro-optical modulators, is the transition from a linear response $(\Delta\theta \propto B(t))$ to an approximately quadratic response $(\Delta\theta \propto ]B(t)]^2)$ as the magnetic field strength is increased. According to a theory presented by Sommerfield (*Optics*, vol. IV of *Lectures on Theoretical Physics*, Academic Press, N.Y., 1954, pp. 101–106), the Verdet constant $V_e$ is given by $$V_e = \frac{K\omega^2}{(\omega_o^2 - \omega^2)^2 - (\frac{e\omega}{m} B)^2}.$$

where $K$ is a material constant, $\omega$ is the frequency of the applied optical field, $\omega_o$ is the fundamental frequency of a bound electron in the crystal and $e/m$ has its usual meaning. If one considers radiation at a wavelength $\lambda = 4358$ A, for example, a 1% departure from its B-independent value of $V_e$ in crown glass (lightly doped with barium) and in fused quartz requires field strengths of $2.53 \times 10^8$ Gauss and $3.15 \times 10^8$ Gauss, respectively, which are orders of magnitude larger than the field required here for manageable $\Delta\theta$.

For crown glass and fused quartz, the Verdet constant $V_e$ has the values $7 \times 10^{-4}$ degrees/Gauss-cm and a $4.8 \times 10^{-4}$ degrees/Gauss-cm, respectively, at $\lambda = 4358$ A. For a 10-cm length crystal, then, the required half wave magnetic field strengths ($\Delta\theta = \pi/2$) are 12857 Gauss and 18750 Gauss, respectively.

One may also use the series of glasses manufactured by Hoya Glass Works which contain small concentrations of $Ga^+$, $In^{3+}$, $Tl^+$, $Ge^{4+}$, $Sn^{2+}$, $Pb^{2+}$, $As^{3+}$, $Sb^{3+}$ or $Bi^{3+}$ or glasses having a high PbO content; these glasses have much higher Verdet constants, a representative example being Hoya's FR-5 with $V_e = -0.173$ degrees/Oerst-meter at $\lambda = 6328$ A. Other interesting solids include: Cu Cl ($V_e = 2 \times 10^{-4}$ at $\lambda = 5461$ A); Zn s ($V_e = 2.9 \times 10^{-4}$ at $\lambda = 5461$ A); dense flint glass ($V_e = 3.33 \times 10^{-4}$ at $\lambda = 10,600$ A and $V_e = 0.017$ at $\lambda = 6328$ A); quartz glass ($V_e = 6 \times 10^{-5}$ at $\lambda = 10,600$ A); $As_2O_3$ - doped glass ($V_e = 4.4 \times 10^{-3}$ at $\lambda = 6329$ A); and various solid state laser materials such as 0° cut sapphire ($V_e = 7.4 \times 10^{-4}$ at $\lambda = 4305$ A), 1.0 wt % $Nd_2O_3$ - doped flint glass ($V_e = 1.4 \times 10^{-3}$ at $\lambda = 4470$ A), and 2.0 wt % $Nd_2O_3$ - doped barium crown glass ($V_e = 2.4 \times 10^{-4}$ at $\lambda = 4442$ A). The Verdet constants of these solids decrease with increasing wavelength approximately as $\lambda^{-n}$ with n ranging from 1.99 (2.0 - wt % $Nd_2O_3$ - doped barium glass) to 3.2 (dense flint, undoped); thus, high $V_e$ may be attainable for many magneto-optically active solids with uv or "blue" visible wavelength light. To be sure, some solids such as diamond ($V_e$ 2.8 $\times 10^{-5}$ at $\lambda = 5461$ A) and ruby ($V_e$ 1.6 $\times 10^{-6}$ for 0° cut at $\lambda = 4770$ A) may be magneto-optically inactive.

$V_e$ for a solid may increase markedly with temperature and may even change sign. The solid $NH_4Fe(SO_4)\cdot 12H_2O$ at $\lambda = 5461$ A has $V_e(T = 26°$ C$) = -1.45 \times 10^{-6}$ (deg/cm-Gauss) and $V_e(T = 1.36°$ K$) = +4.19 \times 10^{-3}$. Magneto-optically active materials with low dispersion tend to have low $V_e$ and high damage thresholds, and inversely, as observed by Eidmann et al. in 5 Journal of Physics E (1972) pp. 56–58. Thus, dense flint glass with a relatively high $V_e$ is damaged by a free-running laser (pulse duration 800 $\mu$sec) at energy densities $\epsilon < 2$ Joules/cm² and by a Q-switched laser (pulse duration 10 nsec) at $\epsilon < 3$ Joules/cm²; while quartz glass, with a much smaller $V_e$ (by a factor of 6.6), has a damage threhold $\epsilon < 10$ Joules/cm² for a Q-switched laser (pulse duration 10 nsec).

One may also use selected organic and inorganic liquids and even gases as the magneto-optically active material. A number of interesting fluids are collected in D. E. Gray et al, *American Institute of Physics Handbook*, N.Y., McGraw-Hill, 1963, pp. 6–91 to 6–95, and in Cole, 34 Journal of Glass Technology (1950) 220-37. $V_e$ for a gas is $10^{-4}$ as large as $V_e$ for a good solid. Liquids, especially organic liquids, have $V_e$ of the same order as $V_e$ for moderately good glasses; examples are $CS_2$ ($V_e = 0.0354$ deg/cm - Gauss at $\lambda = 6328$ A), $C_6H_6$ ($V_e = 0.026$ at $\lambda = 6323$ A), HCl ($V_e = 0.019$ at $\lambda = 6328$ A), $CCl_4$ ($V_e = 0.014$ at $\lambda = 6323$ A), benzene ($V_e = 4.9 \times 10$ at $\lambda = 5893$ A) and toluene ($V_e = 4.4 \times 10^{-4}$ at $\lambda = 5893$ A).

One potentially troublesome problem of control which arises in use of a magneto-optically active material is hysteresis. Dismukes et al., in 5 Applied Optics (1966) pp. 1246–47, studied ten good active materials at various magnetic field rise times in the microsecond-millisecond range and field strengths 410 kilogauss they found that the optical rotation for a pulsed magnetic field at any specified field value was slightly lower on ascent than on descent of the field; this difference ranged from 1–2.6% (of maximum rotation angle) for a rise time of $\tau = 720$ $\mu$ sec at $\lambda = 6328$ A, and the % difference increased approximately as $\tau^{-1/2}$. One can, of course, avoid this problem of working with, say, only the ascending portion of the magnetic field B(t), or by correcting for the asymmetry in the calculations of transmitted radiation, or by the use of low magnitude fields ( 1 kilogauss). Finally, one may even employ materials with natural optical activity ($\Delta\theta = (V_{eo} + V_{e}B) L$), suitably adjusting the relative angle between polarizer and analyzer directions.

As in the embodiments characterized by FIG. 1, for modulatation purposes the magnetic field in FIG. 2 may vary with time according to $$B(t) = B_o + B_1 \sin(\omega t + \beta)$$

or according to any other reasonable time dependence. but if one seeks to impress a sum of two or more sinusoidal and cosinusoidal functions, analogous to the foregoing approach with Pockels and Kerr cells, some rather severe inductive effects arise from coupling and counterreactions of the multiple impressed coil currents required. However, in principle, the impressed finite Fourier sum for B(t) will work here as it does for the Pockels cell and Kerr cell.

Further, all the foregoing remarks on optimization of the linear modulator efficiency n and envelope growth rate $\dot{e}$ with respect to the reflectivity parameter also apply to the linear magneto-optical modulator.

FIGS. 1 and 2 indicate the use of polarizer means 17 between the etalon 15 and the active element, in this instance a modulator 18 or 19. The polarizer means may be placed between the beam splitting means 12 and the etalon 15 or even before the beam splitting means 12. One means of achieving this latter alternative is to insert a Brewster angle window in the laser cavity (not shown here) at the nearest end of the cavity, as is conventionally done to produce polarized light. This may not be 100% effective in producing polarized light at the active element 18 or 19, however, as some depolarization and other deleterious effects may occur at the beam splitting means 12 and/or at the etalon 15; a further deleterious effect arises from mode compensation within the laser, whereby a portion (admittedly small) of the light at an undesired wavelength of oscillation may not be fully polarized by the Brewster window through which it passes.

Figure 4:
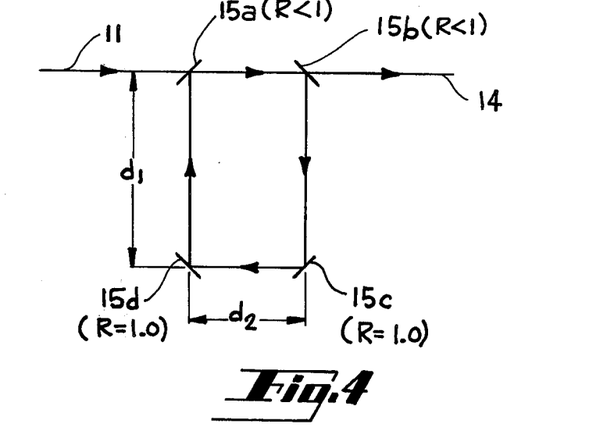
FIG. 4 is an alternative embodiment of the partially transmissive reflective means for producing a sequence of radiation pulses.

The etalon 15 in FIGS. 1 and 2 may be replaced by an arrangement of partially reflective means designed to cause the radiation to trace out a closed polygonal path, with a portion of the radiation transmitted as a pulse image at each pass around the polygonal circuit; the circuit may be triangular, quadrilateral, etc. One such embodiment is the rectangular circuit 15a–15b–15c–15d shown in FIG. 4, wherein the light enters along the path 13 from the left and follows out the circuit as indicated by the arrows. The reflective means 15a and 15b are partially transmissive, having more or less identical reflectivities satisfying $0 < R_{15a} = R_{15b} < 1$, while the remaining reflective means 15c and 15d are fully reflective ($R = 1.0$) in the preferred embodiment. At each pass around the circuit, a pulse image of substantially the same shape as the original pulse and having intensity substantially equal to $I_o(1-R_{15a})(1-R_{15b})(R_{15a}R_{15b})^{m-1}$ ($m = 1,2,3 \ldots$) will pass along line 14 to the polarizer means 17 and/or the active element 18 or 19. Each pulse image ($m$) will have an associated time delay $D_m = 2(d_1 + d_2)(m-1)/c$ ($c =$ speed of light in the ambient medium) for the embodiment shown in FIG. 4. The optimal choice of the reflectivities $R_{15a}$ and $R_{15b}$ for any polygonal circuits such as that indicated by FIG. 4 is the same as for the etalon: $R_{15a} = R_{15b} = 0.83$ for a linear active element 18 or 19 (Pockels cell, Faraday rotator) and $R_{15a} = R_{15b} = 0.88$ for a quadratic active element (Pockels cell, Kerr cell), if one would maximize efficiency; with analogous considerations for maximization of pulse image envelope growth rate.

The Thomas device, supra, with either $R_1 = R_2$ or $R_1 > R_2$, may also be substituted for the etalon 15 in FIGS. 1 and 2. The sequence of pulses arriving at the active element 18 or 19 will then have an exponentially increasing or constant magnitude pulse image envelope; one might expect that this combination would improve the resulting envelope growth rate $\dot{e}$. Surprisingly, the combination of the Thomas device (replacing the etalon) and the linear modulator is such that both the efficiency $\eta$ and the envelope growth rate $\dot{e}$ are maximized by the choice $R_1 = R_2 = 0.90$ for the (Thomas) reflectivity parameters. With the choice of $N = 20$ pulses as before and $(\phi_1 V_o, \phi_1 V_1, \omega T) = (0, \pi, \pi)$, the theoretical maximum efficiency is $\eta = 1.8\%$ and the theoretical maximum envelope growth rate is $\dot{e} = 0.00029$ $(I_o/\tau)$. Note that both the maximum efficiency and the maximum envelope growth rate of this combination lie below that of either the Thomas system or the linear modulator, used separately. Although Thomas appears to believe that the two pairs of parallel, partially transmissive mirrors must be spaced apart by different distances, our analysis indicates that such restriction is unnecessary, with appropriate choices of the Thomas mirror angles $\theta$ and $\phi$.

Figure 5:
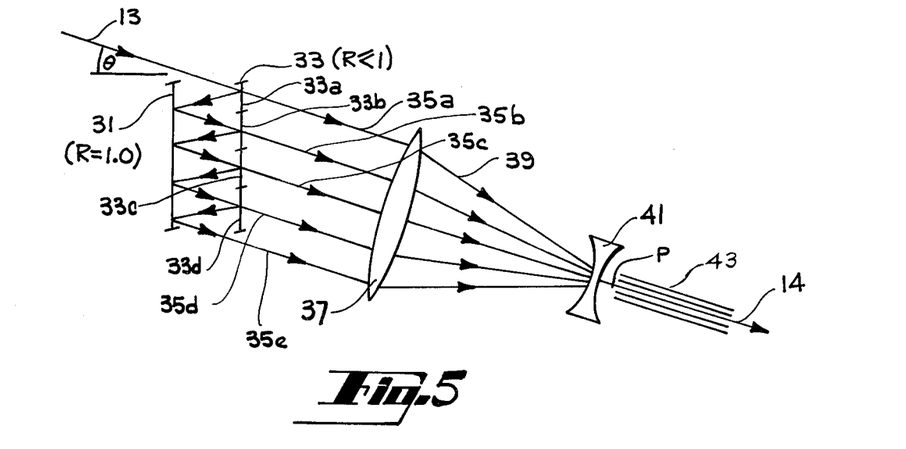
FIG. 5 is another embodiment of the partially transmissive reflective means, which may include a sectored reflector as one of the reflective means.

The etalon 15 in FIGS. 1 and 2 may be replaced by yet another arrangement, shown in FIG. 5: a pair of substantially parallel reflective means 31 and 33, a converging lens 37 and a diverging lens 39, arranged as shown. The original radiation pulse 13 enters the space between the reflective means 31 and 33 in such manner as to avoid first contacting the reflective means 31 (reflectivity $R_{31} = 1.0$) and instead first contacts the reflective means 33 (reflectivity $R_{33} < 1.0$) at an angle < removed from normal incidence. A fraction $1-R_{33}$ of the original pulse intensity is transmitted as the first pulse image along 35a; the remainder is reflected once each from 33 and then 31; a fraction $R_{33}(1-R_{33})$ of the original pulse intensity is then transmitted as a second pulse image along 35b; the remainder is then re-reflected once from each reflective means 33 and then 31; and so on. If one generates a total of N pulse images in this manner, the first N-1 of these pulse images (proceeding along 35a, 35b, 35c, 35d in FIG. 5) will have intensity $I_o(1-R_{33})R_{33}^{m-1}$ ($m = 1,2, \ldots$ N-1); and the last pulse image (proceeding along 35e in FIG. 5) will have intensity $I_o R_{33}^{N-1}$. Substantially all of the pulse intensity is contained in the first N pulse images, unlike the embodiments of FIGS. 1, 2 and 4. Each pulse image ($m = 1,2 \ldots$ N) is delayed relative to the original pulse by an amount $D_m = 2(m-1)d \sec \theta/c$ ($c =$ speed of light in the ambient medium).

Each pulse image proceeds along one of the substantially parallel lines 35 until it reaches the convergent lens 37. At this point, the paraxially propagating pulse images are brought to a common focus at the focal point (P) of the lens 37. A divergent lens 41, with its negative focus also located at the aforementioned focal point (P), is positioned so that the pulse image rays 39 now become a tightly spaced parallel bundle of rays 43 (ideally, a single ray) propagating along 14 toward the polarizer and/or the active element 19.

The efficiency and pulse image envelope growth rate associated with the embodiment of FIG. 5 are substantially improved over the embodiments of FIGS. 1, 2 and 4, for the same choice of reflectivity parameter $R = R_{33}$. This is evident when one compares the finite sequence of pulse image intensities $[I_o (1-R_{33}), I_o (1-R_{33})R_{33}, \ldots I_o(1-R_{33})R_{33}^{N-2}, I_o R_{33}^{N-1}]$ for FIG. 5 with the infinite sequence $[I_o(1-R)^2, I_o(1-R)^2R^2 \ldots I_o(1-R)^2R^{2(m-1)} \ldots ]$ arising from the embodiments of FIGS. 1, 2 and 4. If the embodiment of FIG. 5 is used with a linear modulator as active element, the efficiency improves to $\eta \doteq 44\%$ (with $R = 0.90$ and a 15% interface loss assumed for the convergent and divergent lens combination); and the pulse image envelope growth rate maximum improves to $\dot{e}_{max} \doteq 0.02$ $(I_o/\tau)$. Substantially all of the original beam intensity issues from the diverging lens 39 along one of the closely spaced beam lines in the first N pulse images (N = 5 in FIG. 5). The intensity of the final pulse ($m = N$) in FIG. 5 has intensity $I_o R^{N-1}$, which may be substantially higher than the intensities associated with the prior pulse images (M = 1 ... N−1). This may actually turn to one's advantage where one desires a sequence of pulse images (after modulation by the active element 19) which are of increasing intensity. The intensity of the last pulse image ($m = N$) might be an order of magnitude higher than that of any prior pulse, with the scheme of FIG. 5 adopted.

A variation on the embodiment of FIG. 5 is also suggested in FIG. 5, where the reflective means 33 is replaced by sectored reflective means comprising individually tailored reflective means 33a, 33b, 33c and 33d, each of which may have a different reflectivity. The sectored reflector was first used by David Milam of Lawrence Livermore Laboratory, for another purpose. This allows one to tailor the intensities of each of the sequence of pulse images which then become, in serial order, $[I_o (1-R_{33a}), I_o R_{33a} (1-R_{33b}), I_o R_{33a}R_{33b} (1-R_{33c}), I_o R_{33a}R_{33b}R_{33c} (1-R_{33d}), I_o R_{33a}R_{33b}R_{33c}R_{33d}]$. For example, if one chooses $R_{33a} = 14/15$, $R_{33b} = 6/7$, $R_{33c} = 3/4$, $R_{33d} = 5/9$, one obtains the intensity sequence $$[\frac{1}{15} I_o, \frac{2}{15} I_o, \frac{3}{15} I_o, \frac{4}{15} I_o, \frac{5}{15} I_o].$$

Any sequence of (positive) pulse image intensities may be reproduced so long as the sum of the intensities equals the original pulse intensity $I_o$. More specifically, if the sequence $(f_1, f_2, f_3, f_4, f_5)$ of pulse intensity fractions is to be reproduced with $f_1 + f_2 + f_3 + f_4 + f_5 = 1.0$ (all $f_\eta < 0$), one merely chooses $$R_1 = 1 - f_1,$$
$$R_2 = \frac{1 - f_1 - f_2}{1 - f_1},$$
$$R_3 = \frac{1 - f_1 - f_2 - f_3}{1 - f_1 - f_2},$$
$$R_4 = \frac{1 - f_1 - f_2 - f_3 - f_4}{1 - f_1 - f_2 - f_3},$$

for the sequence of reflectivity parameters, and the pulse intensity sequence $\{f_n\}_{n=1}^5$ is obtained, with obvious extensions to $N \neq 5$ pulses.

The aperture in FIG. 5 through which the remaining beam 35e propagates is formally equivalent to a sectored reflector component with zero reflectivity ($R_5 = 0$ in FIG. 5). Thus, the alternative embodiment of the invention in FIG. 5 may also be used without the polarizing and analyzing means (17 and 23) and active element (18 or 19); in such an instance, the efficiency is substantially 1.00 apart from losses at the lens surfaces. This last embodiment (sans active element and polarizing and analyzing means) offers a substantial improvement over the analogous Thomas device in that, while the Thomas device without loss plates is limited to exponential rises in intensity from one pulse image to the next, the last embodiment of the subject invention allows prescription of arbitrary pulse image envelope shapes.

Figure 6:
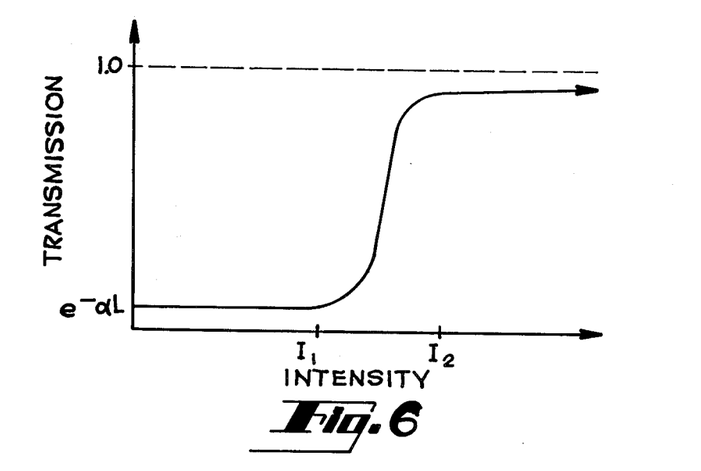
FIG. 6 is a schematic representation of the intensity-dependent transmission response of a saturable absorber which may be used in another embodiment.

An alternative method and apparatus, which achieves shorter envelope rise time at the expense of efficiency, would add a saturable absorber, with transmission given as a function of luminous intensity as shown schematically in FIG. 6, to the basic configuration of FIG. 1 or FIG. 2. The absorber might be inserted between the active element and the second (crossed) polarizer means in FIGS. 1 and 2, or following the second (crossed) polarizer means. However, it should be noted that the final pulse image envelope shape will differ, depending upon where the saturable absorber is placed. If the absorber 27 is inserted between modulator and analyzer, as shown in dotted lines in FIG. 1, the fall in the pulse image envelope (controlled by the geometric fall-off in reflected intensity) may be pronounced. If the absorber 27 is inserted downstream of the analyzer as shown in dotted lines in FIG. 2, the rise in pulse image envelope (controlled by the rise in transmitted polarized intensity through the analyzer) may be most pronounced.

Until the radiation intensity exceeds some intensity $I_1$, the light transmitted by the absorber is nearly zero. As the incident intensity rises from $I_1$ to $I_2$, the transmitted intensity rises sharply and nonlinearly to its saturation value (transmission factor 1), and the corresponding pulse image envelope rises correspondingly quickly in time. This embodiment has substantially lower efficiency due to the reduced transmission at the (predominant) lower intensities. The active material in the saturable absorber may be $SF_6$ (useful for $\lambda = 10.6$ $\mu$m radiation of a $CO_2$ laser); cresyl violet, cresyl violet acetate and nile blue A (useful for $\lambda = 0.63$ $\mu$m radiation of a He-Ne laser); Eastman 9740 and 9860 (useful for $\lambda = 1.06$ $\mu$m radiation of a Nd-YAG laser); rhodamine B (useful for $\lambda = 0.50$–$0.60$ $\mu$m radiation from a rhodamine 6G dye laser); and DDI (1,1'-diethyl-2,2'-dicarbocyanine iodide) in methanol, cryptocyanine in acetone, and dicyanine A in dimethyl sulfoxide (useful for $\lambda = 0.69$ $\mu$m radiation of a ruby laser).

Although the best modes contemplated for practicing the invention have been shown and described herein, it will be apparent that modification and variation may be made without departing from what is regarded to be the subject matter of the invention.

We claim:

1. Apparatus for producing, from a pulsed beam of light, a sequence of light pulses with a pulse envelope of controllable time variation, the apparatus comprising:
    at least two partially transmissive reflective means, spaced apart and positioned to intercept the beam, for producing a sequence of light pulses in response to the original pulse;
    means for linearly polarizing the radiation;
    analyzer means, with the direction of linear polarization oriented at a fixed angle relative to the polarization direction of the polarizer means and positioned to receive the light transmitted by the polarization means, for transmitting only that component of polarized radiation oriented along the polarization direction of the analyzer means;
    a magneto-optical modulator positioned intermediate between the polarizer means and the analyzer means;
    power supply and optical switch means for externally producing a controllable, time-varying electromagnetic signal at the magneto-optical modulator in response to receipt of a portion of the incoming beam of light; and
    pulse directing means for directing a portion of the incoming light beam into the power supply and optical switch means.

2. Apparatus according to claim 1, further including an optical delay line for the incoming light beam.

3. Apparatus according to claim 1, wherein said modulator is a Faraday rotator and said externally produced electromagnetic signal is a magnetic field $B(t)$.

4. Apparatus according to claim 3, wherein the time variation of said current has substantially the form $B(t) = B_o + B_1 \sin(\omega t + \beta)$ with $B_o$, $B_1$, $\omega$ and $\beta$ arbitrary.

5. Apparatus according to claim 3 wherein the Faraday rotator produces an angular rotation of the direction of polarization of an incoming light beam by an amount which varies substantially linearly with the magnitude of the magnetic field $B(t)$.

6. Apparatus according to claim 3 wherein said Faraday rotator includes active material taken from the group consisting of crown glass and fused quartz.

7. Apparatus according to claim 1, wherein said two partially transmissive reflective means comprise an etalon.

8. Apparatus according to claim 1, further including a block of light-transmissive material having two substantially parallel end faces positioned to intercept the beam, and wherein said two partially transmissive reflective means are partially transmissive coatings applied to the parallel end faces of the block of light-transmissive material.

9. Apparatus according to claim 1, wherein said polarizing means is a Brewster angle window operatively associated with a source of the beam of light.

10. Apparatus according to claim 1, further including a saturable absorber, located downstream beamwise of said modulator, for receiving the incident beam of light and transmitting the light at a reduced intensity which is a nonlinear function of the incident intensity.

11. Apparatus according to claim 10, wherein said saturable absorber is located intermediate between said modulator and said analyzer means.

12. Apparatus according to claim 10, wherein said saturable absorber receives the light transmitted by said analyzer means.

13. Apparatus for producing, from a pulsed beam of light, a sequence of light pulses with a pulse envelope of controllable time variation, the apparatus comprising:

at least two partially transmissive reflective means, spaced apart and positioned to intercept the beam, for producing a sequence of light pulses in response to the original pulse;

means for linearly polarizing the radiation;

analyzer means, with the direction of linear polarization oriented at a fixed angle relative to the polarization direction of the polarizer means and positioned to receive the light transmitted by the polarization means, for transmitting only that component of polarized radiation oriented along the polarization direction of the analyzer means;

means for producing a phase shift of two orthogonal components of light in the incoming beam, in response to an externally produced electromagnetic signal, so as to rotate the polarization direction of the light beam, the phase shift means being located intermediate between the polarizer means and the analyzer means, and the externally produced electromagnetic signal having substantially the form $$\epsilon(t) = \epsilon_o + \sum_{n=1}^{N} \epsilon_n \sin(\omega_n t + \beta_n)$$

with $\epsilon_o, \epsilon_1 \ldots \epsilon_n, \omega_1 \ldots \omega_n, \beta_1 \ldots \beta_n$ and N (a positive integer) arbitrary.

power supply and optical switch means for externally producing a controllable, time-varying electromagnetic signal at the phase shift means in response to receipt of a portion of the incoming beam of light; and pulse directing means for directing a portion of the incoming light beam into the power supply and optical switch means.

14. Apparatus according to claim 13, wherein said phase shift means is an electro-optical modulator and said electromagnetic signal is an electric voltage $V(t)$.

15. Apparatus according to claim 14, wherein said electro-optical modulator includes an active material which produces said phase shift and said phase shift varies substantially linearly with the magnitude of said electric voltage $V(t)$.

16. Apparatus according to claim 14, wherein said electro-optical modulator includes an active material which produces said phase shift and said phase shift varies substantially quadratically with the magnitude of said electric voltage $V(t)$.

17. Apparatus according to claim 13, wherein said phase shift means is a magneto-optical modulator and said electromagnetic signal is a magnetic field $B(t)$.

18. Apparatus according to claim 17, where said magneto-optical modulator includes an active material which produces said phase shift and said phase shift varies substantially linearly with the magnitude of said magnetic field $B(t)$.

19. Apparatus according to claim 13, further including at least one substantially fully reflective mirror arranged to direct the light reflected from one of said two partially transmissive reflective means to the other of said partially transmissive reflective means so as to form a closed polygonal path for the light.

20. Apparatus for producing, from a pulsed beam of light, a sequence of light pulses with a pulse envelope of controllable time variation, the apparatus comprising:

at least two partially transmissive reflective means, spaced apart and positioned to intercept the beam, for producing a sequence of light pulses in response to the original pulse;

the reflective means being two substantially parallel mirrors which face one another and are so arranged that the beam enters the space between the two mirrors without first contacting either mirror, and the beam is reflected from each mirror at a fixed angle relative to the normal of each of the mirrors;

means for linearly polarizing the radiation;

analyzer means, with the direction of linear polarization oriented at a fixed angle relative to the polarization direction of the polarizer means and positioned to receive the light transmitted by the polarization means, for transmitting only that component of polarized radiation oriented along the polarization direction of the analyzer means;

means for producing a phase shift of two orthogonal components of the light beam, in response to an externally produced electromagnetic signal, so as to rotate the direction of polarization of the light beam, located intermediate between said analyzer means and said polarizer means;

power supply and optical switch means for externally producing a controllable, time-varying electromagnetic signal at the phase shift means in response to receipt of a portion of the incoming beam of light; and pulse directing means for directing a portion of the incoming light beam into the power supply and optical switch means.

21. Apparatus according to claim 20, wherein one of said two mirrors is substantially 100% reflective.

22. Apparatus according to claim 20, further including focusing means for substantially recollimating the light issuing from said mirrors.

23. Apparatus according to claim 22, wherein said focusing means is a divergent lens and a convergent lens which is located intermediate between said mirrors and the divergent lens, a focal point of the divergent lens being substantially coincident with a focal point of the convergent lens.

24. Apparatus according to claim 20, wherein one of said two mirrors is a sectored reflector comprising a finite number of partially transmissive mirrors, each of which may have a different transmission coefficient, a portion of the beam being partially transmitted through at least two of the partially transmissive mirrors.

25. Apparatus according to claim 24, wherein said sectored reflector is a linear array of said partially transmissive mirrors, with the sequence of values of transmission coefficients being a predetermined sequence.

26. Apparatus for producing, from a pulsed beam of light a sequence of light pulses with a pulse envelope of controllable time variation, the apparatus comprising:

a first pair of reflective means, facing one another and spaced apart and substantially parallel, with one of the reflective means being fully reflective and the other being partially transmissive, with the two reflective means being so arranged that the incoming light beam enters a space between the two reflective means without first contacting either reflective means, and the beam is reflected from each member of the first pair of reflective means at a fixed angle relative to a surface normal of each of the first pair of reflective means, a beam incident upon the partially transmissive member being partially transmitted therethrough and being partially reflected toward the fully reflective member of the first pair of reflective means, and with the fully reflective member re-reflecting this partially reflected portion of the light beam toward the partially transmissive member of the first pair of reflective means, so as to produce at least two partially transmitted portions of a light beam transmitted through and emerging at different positions from the partially transmissive member of the first pair of reflective means;

a second pair of reflective means, facing one another and spaced apart and substantially parallel, with one of the two reflective means being fully reflective and the other being partially transmissive, with the partially transmissive member of the second pair of reflective means being arranged to receive and partially transmit each of the partially transmitted light beams emerging from the partially transmissive member of the first pair of reflective means, each of the light beams which are partially transmitted through the partially transmissive member of the second pair of reflective means being received and re-reflected from the fully reflective member of these means at a fixed angle relative to a surface normal of each of the second pair of reflective means, the light beams which are re-reflected from the fully reflective member of the second pair of reflective means being combined with the light beams received from the first pair of reflective means at the partially transmissive member of the second pair of reflective means into a composite beam, for producing a sequence of at least two light pulses, spaced in time, in response to the original light pulse;

means for linearly polarizing the radiation;

analyzer means, with the direction of linear polarization oriented at a fixed angle relative to the polarization direction of the polarizing means and positioned to receive the light transmitted by the polarizing means, for transmitting only that component of polarized radiation oriented along the polarization direction of the analyzer means;

modulator means positioned intermediate between the polarizing means and the analyzer means;

power supply and optical switch means for externally producing a controllable, time-varying electromagnetic signal at the electro-optical modulator, in response to receipt of a portion of the incoming beam of light; and pulse directing means for directing a portion of the incoming light beam into the power supply and optical switch means.

27. Apparatus, according to claim 26, wherein said modulator means is an electro-optical modulator.

28. Apparatus, according to claim 26, wherein said modulator means is a magneto-optical modulator.

29. Apparatus for producing, from a beam of light of intensity $I_o$, a temporal sequence of N light pulses of intensity substantially $$\{f_n I_o\}_{n=1}^{N},$$

with the numbers $f_n$ arbitrary and nonnegative and satisfying $$\sum_{n=1}^{N} f_n = 1,$$

the apparatus comprising:

two reflective means facing one another, spaced apart and substantially parallel to one another;

the two reflective means being so arranged that the beam enters the space between the two reflective means without first contacting either reflective means, the beam or a portion thereof, then being reflected from each reflective at least N-1 times at a fixed angle relative to the normal to the surface of each reflective means;

one reflective means being substantially fully reflecting;

the second reflective means being a sectored reflector comprising N partially transmissive mirrors having substantially the following reflectivity coefficients $$R_1 = 1 - f_1,$$

$$R_n = \frac{1 - \sum_{k=1}^{n} f_k}{1 - \sum_{j=1}^{n-1} f_j} (n = 2, \ldots, N - 1),$$

$$R_N = 0,$$

the components of the sectored reflector being positioned so that the beam of light is alternately reflected from the first and second reflective means so as to contact once each of the N partially transmissive mirrors comprising the sectored reflector.

30. Apparatus according to claim 29, wherein the transmitivities
$$T_n = 1 - R_n (n = 2 \ldots N - 1)$$
satisfy $$\frac{T_n(1 - T_{n-1})}{T_{n-1}} \geq e^\Delta$$

for some fixed positive number $\Delta$.

31. Apparatus according to claim 29, further including focusing means for collecting and substantially recollimating into a single light beam the plurality of beams issuing from the two reflective means.

32. Apparatus according to claim 31, wherein said collection and recollimation means is a divergent lens and a convergent lens, positioned between the divergent lens and said two reflective means, a focal point of the divergent lens being substantially coincident with a focal point of the convergent lens.

33. Apparatus according to claim 29, further including focusing means for collecting and substantially recollimating the pulses issuing from said partially transmissive reflective means into a single beam.

34. Apparatus according to claim 33 wherein said collection and recollimation means is a divergent lens and a convergent lens located between said two divergent means, a focal point of the divergent lens being substantially coincident with a focal point of the convergent lens.

35. A method for producing, from a pulsed beam of light, a sequence of light pulses with a pulse envelope of controllable time variation, the method comprising the steps of:

passing the beam through at least two spaced, partially reflective means so as to produce a sequence of radiation pulses in response to the original pulse;

linearly polarizing the radiation;

producing a phase shift of the polarized light, in response to an externally applied electromagnetic signal;

receiving a portion of the original beam and, in response thereto, generating a controllable, time-varying electromagnetic signal which consists of a sum of a least two sinusoidally time-varying signals, so chosen that said phase shift produced attains a prescribed sequence of values at a prescribed sequence of times; and passing beam through a polarization analyzer, with the direction of linear polarization oriented at a fixed angle relative to the polarization direction of the polarizing means.

36. A method for producing, from a pulsed beam of light, a sequence of light pulses with a pulse envelope of controllable time variation, the method comprising the steps of:

passing the beam through at least two spaced, partially reflective means so as to produce a sequence of light pulses in response to the original pulse;

passing the light through a polarizer;

directing each of the polarized pulses through a magnetooptical modulator;

receiving a portion of the original beam and, in response thereto, generating a controllable, time-varying electromagnetic signal across the modulator; and passing the beam through a polarization analyzer, with the direction of linear polarization oriented at a fixed angle relative to the polarization direction of the polarizer.

37. A method for producing, from a pulsed beam of light of intensity $I_o$, a temporal sequence of N light pulses of intensity substantially $$\{f_n I_o\}_{n=1}^N,$$

with the numbers $f_n$ arbitrary and nonnegative and satisfying $$\sum_{n=1}^{N} f_n = 1,$$

the method comprising the steps of:

passing the beam between two reflective means, one being fully reflecting means and the other being a sectored reflector, facing one another, spaced apart and substantially parallel so that the beam enters the space between the two reflective means without first contacting either reflective means, the reflectivity parameters of the sectored reflector being chosen according to $$R_1 = 1 - f_1,$$

$$R_n = \frac{1 - \sum_{k=1}^{n} f_k}{1 - \sum_{j=1}^{n-1} f_j} (n = 2, \ldots, N - 1),$$

$$R_n = 0;$$

alternately reflecting the beam of light or portions thereof between the fully reflective means and the sectored reflector so as to contact once each of the partially transmissive reflectors comprising the sectored reflector.

38. A method according to claim 37, further including the step of collecting and substantially recollimating the plurality of beams issuing from the sectored reflector into a single light beam.

* * * * *